United States Patent
Stam et al.

(10) Patent No.: US 9,521,809 B2
(45) Date of Patent: Dec. 20, 2016

(54) BALE PROCESSOR WITH AUTOMATIC CONTROL

(71) Applicant: Vermeer Manufacturing Company, Pella, IA (US)

(72) Inventors: Philip D. Stam, Pella, IA (US); Lucas B. Graham, New Sharon, IA (US)

(*) Notice: Subject to any disclaimer, the term of this patent is extended or adjusted under 35 U.S.C. 154(b) by 405 days.

(21) Appl. No.: 14/043,119

(22) Filed: Oct. 1, 2013

(65) Prior Publication Data
US 2015/0090817 A1 Apr. 2, 2015

(51) Int. Cl.
*B02C 25/00* (2006.01)
*A01F 29/10* (2006.01)
*A01F 29/00* (2006.01)

(52) U.S. Cl.
CPC ............. *A01F 29/10* (2013.01); *A01F 29/005* (2013.01); *B02C 25/00* (2013.01)

(58) Field of Classification Search
CPC .......... B02C 23/02; B02C 23/00; B02C 25/00; A01F 29/005; A01F 29/01; A01F 29/14; A01F 29/10; Y10S 241/605
USPC .......................... 241/605, 189.1, 186.5, 223, 101.2, 241/186.35
See application file for complete search history.

(56) References Cited

U.S. PATENT DOCUMENTS

| | | | |
|---|---|---|---|
| 3,509,924 A | 5/1970 | Newhouse | |
| 3,868,062 A | 2/1975 | Cunningham | |
| 3,966,128 A | 6/1976 | Anderson | |
| 4,034,918 A | 7/1977 | Culbertson | |
| 4,134,554 A | 1/1979 | Morlock | |
| 4,210,289 A | 7/1980 | Arnoldy | |
| 4,442,877 A | 4/1984 | Uitermarkt | |
| 4,449,672 A * | 5/1984 | Morlock | A01D 87/127 241/101.76 |
| 4,452,400 A | 6/1984 | Williams | |
| 4,524,916 A * | 6/1985 | Keyes | A01D 87/127 241/101.76 |
| 4,721,257 A | 1/1988 | Williams | |
| 4,793,561 A | 12/1988 | Burda | |
| 4,865,094 A | 9/1989 | Stroud | |
| 5,020,579 A | 6/1991 | Strong | |
| 5,088,532 A | 2/1992 | Eggers | |
| 5,205,496 A | 4/1993 | O'Donnell | |
| 5,230,475 A | 7/1993 | Gerner | |

(Continued)

FOREIGN PATENT DOCUMENTS

DE 60130059 12/2007
EP 1193038 4/2002

(Continued)

OTHER PUBLICATIONS 9-pages—Notification and International Search Report from corresponding PCT application.

(Continued)

*Primary Examiner* — Faye Francis
(74) *Attorney, Agent, or Firm* — Sturm & Fix LLP

(57) ABSTRACT

A bale processor with a bale processing bin that has a bale cutter therein and an engagement section on the bale cutter for supporting part of a bale. A conveyor section supports another part of the bale. The bale processor has a load sensor that senses the load, or something that is a function of the load, on the bale cutter and a controller controls feeding of the bale to the bale cutter and/or the position of the engagement section, based on the function of the load on the cutter.

21 Claims, 6 Drawing Sheets

(56) References Cited

U.S. PATENT DOCUMENTS

| | | | |
|---|---|---|---|
| 5,285,973 A | | 2/1994 | Goforth |
| 5,368,238 A | * | 11/1994 | Bergkamp ............ A01F 29/005 241/223 |
| 5,413,286 A | | 5/1995 | Bateman |
| 5,588,474 A | | 12/1996 | Egging |
| 5,845,689 A | | 12/1998 | Egging |
| 6,014,996 A | | 1/2000 | Egging |
| 6,029,919 A | | 2/2000 | Rousseau |
| 6,293,479 B1 | | 9/2001 | Kaczmarski |
| 6,375,104 B1 | | 4/2002 | Hruska |
| 6,474,577 B2 | | 11/2002 | Ikegami |
| 6,546,705 B2 | | 4/2003 | Scarlett |
| 6,578,784 B1 | | 6/2003 | Lischynski |
| 6,708,911 B2 | | 3/2004 | Patterson |
| 6,711,824 B2 | | 3/2004 | Hruska |
| 6,814,320 B1 | | 11/2004 | Morey |
| 6,830,204 B1 | | 12/2004 | Morey |
| 6,854,673 B2 | | 2/2005 | Strutz |
| 6,886,763 B2 | | 5/2005 | Lepage |
| 7,011,258 B2 | | 3/2006 | O'Halloran |
| 7,040,558 B2 | | 5/2006 | Stelter |
| 7,044,409 B2 | | 5/2006 | Stelter |
| 7,077,345 B2 | * | 7/2006 | Byram et al. ................. 241/35 |
| 7,232,083 B2 | | 6/2007 | Stelter |
| 7,472,854 B1 | | 1/2009 | Bird |
| 7,546,966 B2 | | 6/2009 | Lepage |
| 7,581,691 B2 | | 9/2009 | Helmeczi |
| 7,597,279 B1 | | 10/2009 | Stelter |
| 7,624,937 B2 | | 12/2009 | Stelter |
| 7,637,444 B2 | | 12/2009 | Stelter |
| 7,654,479 B2 | | 2/2010 | Stelter |
| 7,658,215 B2 | | 2/2010 | Chapman |
| 7,780,102 B2 | | 8/2010 | Majkrzak |
| 8,066,208 B2 | * | 11/2011 | Bennett ................. A01F 29/005 241/186.3 |
| 8,109,303 B1 | | 2/2012 | Holmes |
| 8,141,802 B2 | | 3/2012 | Galloway |
| 8,307,866 B2 | | 11/2012 | Leonard |
| 2004/0112999 A1 | * | 6/2004 | Byram ................. B02C 13/286 241/34 |
| 2005/0205706 A1 | | 9/2005 | LePage |
| 2006/0086857 A1 | | 4/2006 | Lepage |
| 2013/0091743 A1 | | 4/2013 | Berg |
| 2014/0374520 A1 | * | 12/2014 | Wentz ................... A01F 29/005 241/186.35 |
| 2014/0374521 A1 | * | 12/2014 | Wentz ................... A01F 29/005 241/186.35 |

FOREIGN PATENT DOCUMENTS

| | | |
|---|---|---|
| WO | 89/11786 | 12/1989 |
| WO | 2007/140890 | 12/2007 |
| WO | 2013/066287 | 5/2013 |

OTHER PUBLICATIONS 6-pages—Notification and International Preliminary Report on Patentability from corresponding PCT application—dated Apr. 14, 2016.

* cited by examiner

BALE PROCESSOR WITH AUTOMATIC CONTROL

TECHNICAL FIELD

This invention relates generally to a bale processor with a bale processing bin having a bale cutter therein, an engagement section on the bale cutter for supporting part of a bale and a conveyor section for supporting another part of the bale; and, more particularly to a method and apparatus for efficiently using the bale processor by sensing a dynamic condition of a drive system component associated with a power draw on the drive system and controlling feeding of the bale to the bale cutter based on such dynamic condition.

BACKGROUND

Bale processors are devices used to spread the content of bales of forage in a controlled way for reasons such as mulching or feeding livestock.

Examples of bale processors are shown in application PCT/US2011/058514, filed Oct. 31, 2011, to Graham et al., U.S. Pat. No. 6,708,911 to Patterson et al., U.S. Pat. No. 6,711,824 to Hruska, U.S. Pat. No. 6,578,784 to Lischynski et al., U.S. Pat. No. 6,886,763 to Lepage et al., U.S. Pat. No. 7,581,691 to Helmeczi et al. and Published U.S. Patent Application No. 2006/0086857 to Lepage et al., all of which are incorporated herein by reference in their entirety.

Bale processors have a bin for receiving a bale to be processed. A bale cutter is disposed in the bottom of such bin and these bale cutters can be, and typically are, rotors with flails that extend up through bale support bars that support the bale so that only a small portion of the exterior of the bale is torn off by the flails at one time as the rotor rotates the flails in a circle. Also disposed in the bottom of the bin is a conveyor for moving the bale towards the bale cutter, usually rotating the bale at the same time that the conveyor moves the bale towards the bale cutter. These conveyors and bale support bars can, for example, be like those shown in FIG. 16 or 17 of published PCT application No. WO 2013/066287, published on May 10, 2013, which published application is incorporated herein by reference in its entirety.

Because bales are not always uniform in shape, condition, material, density, moisture content, etc., some parts of the bale may break off evenly and some parts may not, causing wide and unpredictable variations in the load on the bale cutter as the bale cutter systematically removes those portions from the bale which are contacted by the bale cutter. Because of these wide and unpredictable fluctuations of the load on the bale cutter, it can be difficult to supply an optimum power from the engine/motor needed to rotate the bale cutter.

This problem is exacerbated by the fact that there is a significant spatial relationship between the bale conveyor and the rotor, causing an inherent uncertainty about the load on the engine/motor that is powering the rotor and conveyor and thereby making it even more difficult to operate the engine/motor at an optimum and efficient speed.

Accordingly, since there is typically not a uniform correlation between the load on the bale cutter and the power needed to operate the bale cutter in bale processors, there is a need for a method and apparatus for solving this problem (i.e., the ability to accommodate such a lack of uniformity).

SUMMARY OF THE INVENTION

By sensing a dynamic condition of a drive system component associated with a power draw on the drive system such as the speed of the cutter load, it is possible to determine when the bale cutter is under a high load/stress level (e.g., working through a larger diameter portion of the bale; tearing apart an especially dense or wet section; etc.) or, alternatively, under a relatively low level of stress (e.g., working through a smaller diameter, drier, and/or less dense bale portion).

In one embodiment of the invention, when a higher stress/load level is sensed, the bale conveyor speed is automatically reduced, to allow the flails more time to work through a more difficult section of the bale. At the other extreme, where low stress levels/loads are sensed, the bale conveyor speed is automatically adjusted to a maximum amount to increase the bale infeed speed. Of course similar adjustments are automatically made between the aforementioned extreme situations to keep the engine/motor operating efficiently.

In another embodiment of the invention, when a higher stress/load level is sensed, the bale support bars are automatically adjusted so the bale cutter takes a smaller bite of the bale, to allow the bale cutter more time to work through a more difficult section of the bale. At the other extreme, where low stress levels/loads are sensed, the bale support bars are automatically adjusted to take a bigger bite from the bale. For example if the bale cutter is a rotor with flails, the flails would be extended farther into the bale during rotation of the rotor when low stress levels/loads occur, and the flails would not be extended as far into the bale when a higher stress/load level is sensed.

In still another embodiment, both the conveyor speed and the position of the bale support bars can both be automatically adjusted in an attempt to achieve an optimum correlation between the load on the bale cutter and the power input to the bale cutter, regardless of whether the power is being supplied from a tractor power take off, an electric motor, or another source of power.

Accordingly, the present invention solves the aforementioned problem of how to maintain an optimum correlation between the load on bale cutter and the power being sent to operate the bale cutter.

BRIEF DESCRIPTION OF THE DRAWINGS

The above needs are at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
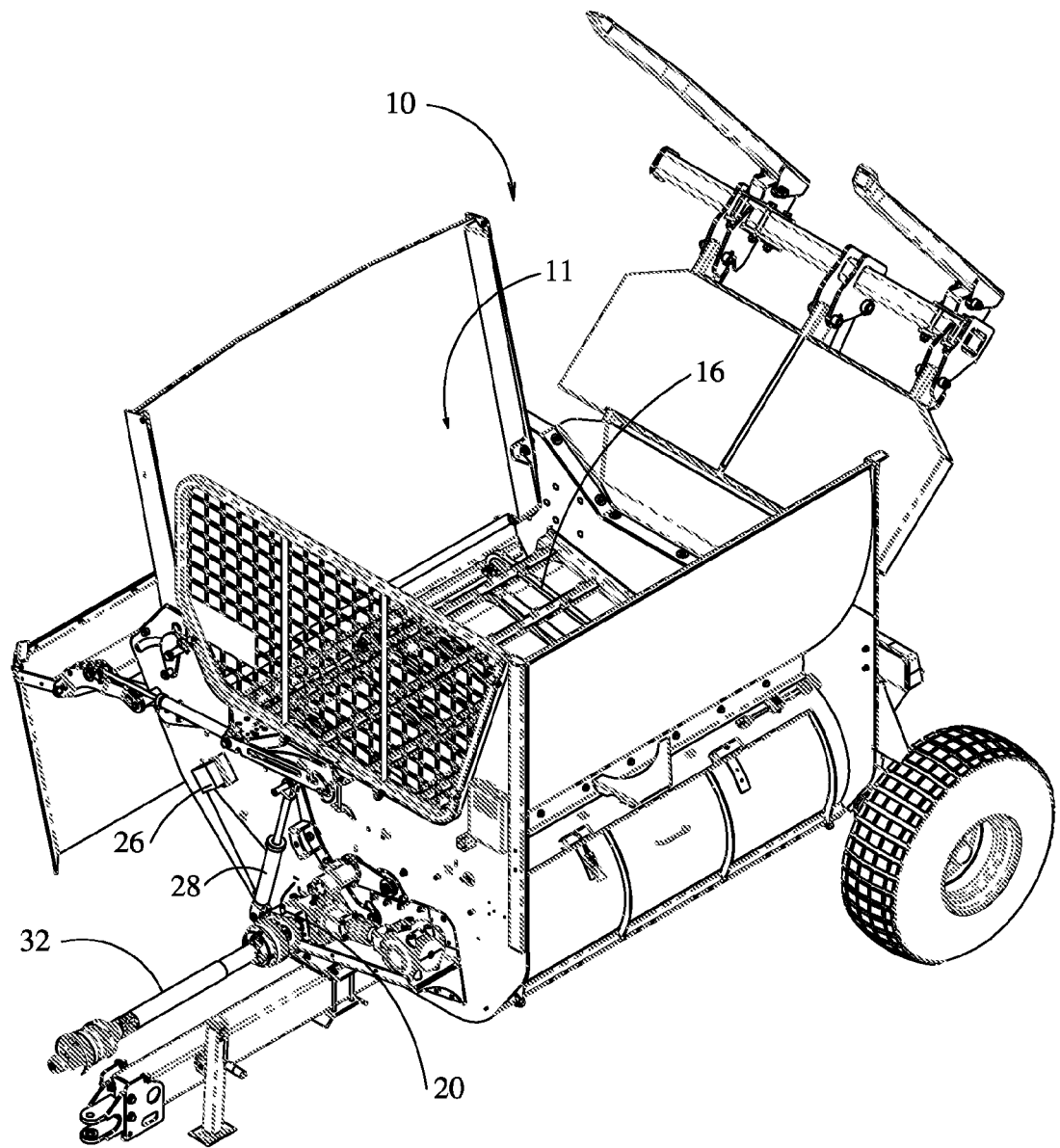
FIG. 1 is a perspective view of a bale processor constructed in accordance with the present invention.

Referring now to the drawings, wherein like reference numerals indicate identical or similar parts throughout the several views, FIG. 1 shows a bale processor (10) having a bale processing bin (11). Looking to FIG. 2, a bale conveyor (16) is positioned on one side of the bottom of the bale processing bin (11) and a bale cutter (14) in the form of a rotor (14*r*) with flails (14*f*) is at the other side of the bottom of the bale processing bin (11).

Figure 2:
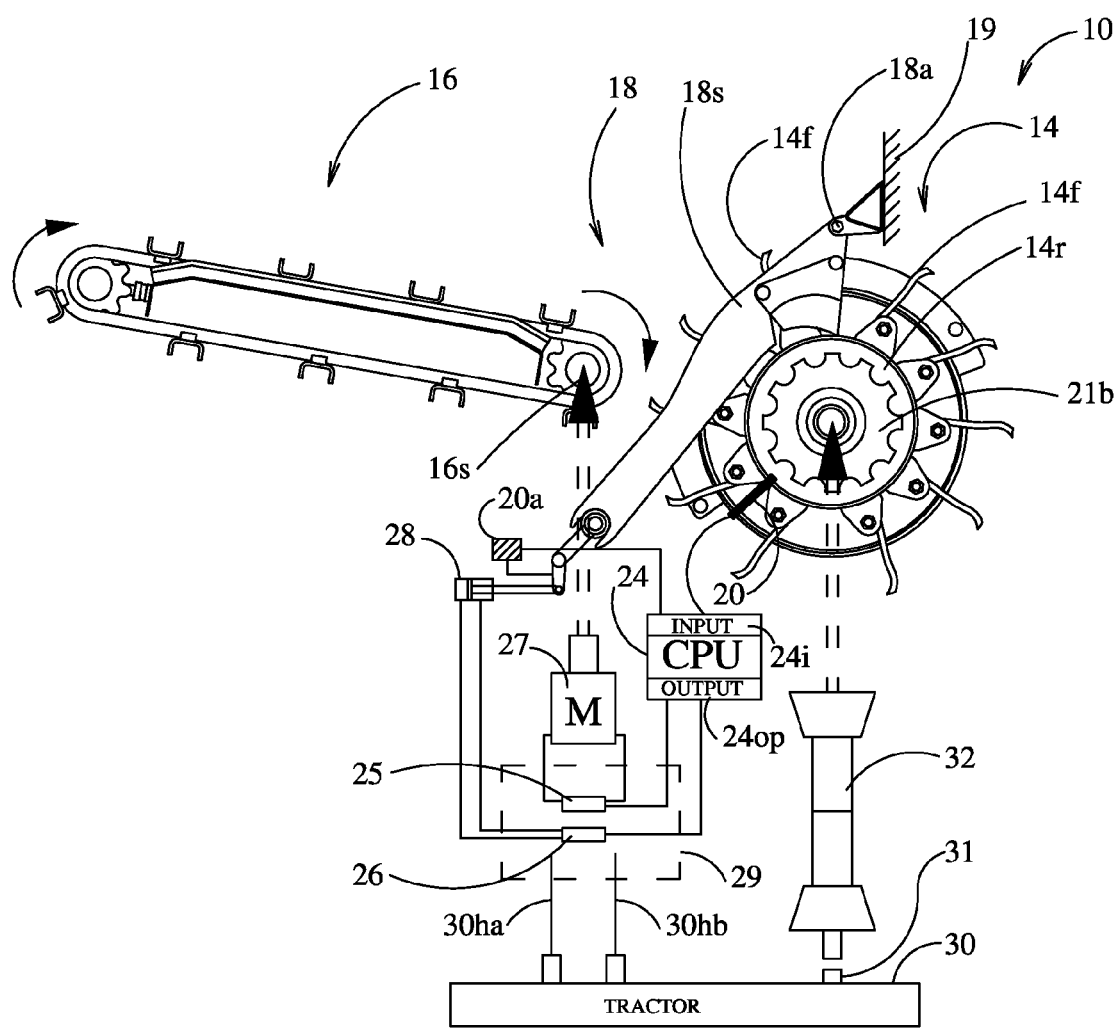
FIG. 2 is a schematic view of the bale processor of FIG. 1 showing an automatic control system for use in conjunction with a tractor.

Still looking at FIG. 2, a bale engagement device (18) is in the form of a plurality of what are commonly called "slug bars" (18*s*). The terms "bale engagement device", "bale support bars" and "slug bars" are used interchangeably in this document, and it is further understood that these terms are intended to be defined generically as any bar or support element that supports a bale in the bale processing bin that allows a space for hammers or flails or the like to extend upwardly between beyond the "device" elements, "bars", or grates that together support a bale. These slug bars (18*s*) are pivotally attached to the frame (19) at pivot point (18*a*). The flails (14*f*) extend upwardly beyond the slug bars (18*s*) and this distance that the flails (14*f*) extend upwardly past the slug bars (18*s*) can be adjusted by the pivoting of the slug bars (18*s*), as will be explained in more detail below when discussing the engagement limiting device (18). Looking to FIG. 4, the bale conveyor (16) is offset from the bale cutter (14) and the engagement limiting device (18) so that part of the weight of a bale (17) in the bale processing bin (11) will be on the conveyor (16) and another part of the bale will be on the engagement limiting device (18), which in this embodiment (10), is essentially the slug bars (18*s*).

FIG. 2 also shows a first embodiment of a feed control system that monitors the load on the bale cutter (14) and automatically controls the speed of the bale conveyor (16) and/or the position of the bale engagement limiting device slug bars (18*s*) as a function of the load on the bale cutter.

Figure 3:
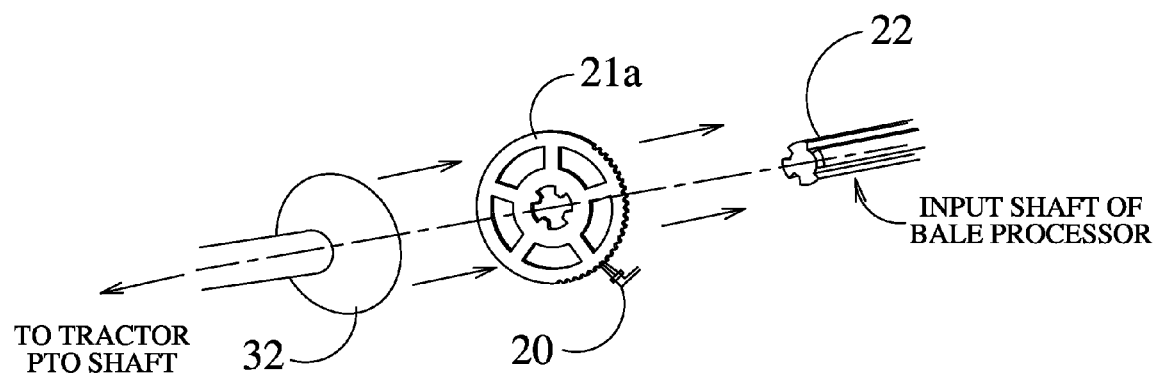
FIG. 3 is a perspective view of a gear attached to an input shaft of the bale processor with a proximity switch for generating an input frequency from a gear placed directly behind the primary driveline input shaft of the primary gearbox of the bale processor.

Referring now to FIG. 3, a proximity switch (20) generates a frequency from a gear (21*a*) placed directly behind the primary driveline input shaft (22) of the primary gearbox of the bale processor (10). Alternatively, as shown in FIG. 2, the proximity switch (20) can be on a gear (21*b*) that is attached to the shaft of the rotor (14). As shown in FIG. 2, this frequency generated by the proximity switch (20) is sent to a controller or central processing unit (24) which can send an output voltage to coils on proportional flow rate hydraulic control valve (25) and/or two direction (double acting) volume control hydraulic valve (26).

In FIG. 2, the valve (25) is a proportional flow rate hydraulic control valve which controls the speed of a motor (27) that controls the speed of the sprocket (16*s*) of the conveyor (16). As the tractor (30) powers the cutter/rotor (14) via power take off shaft (31) and drive train member (32) to turn the rotor (14), the proximity switch (20) senses rotation of gear (21*b*) and sends an input signal (24*i*) to central processing unit (24). Upon sending the input signal (24*i*), an output signal (24*op*) is generated which goes to either or both of the proportional flow rate hydraulic control valve (25) and two direction (double acting) volume control hydraulic valve (26). The tractor (30) supplies hydraulic fluid through hydraulic lines (30*ha*/30*hb*) to the hydraulic system shown schematically in the dashed line box 29. The "drive train" is defined herein to include a path beginning with the motor/engine (230/30), going through the tractor PTO, through any drive train members such member (32) shown in FIG. 3, through an input shaft (22) on the bale processor, through any other parts of the bale processor drive train between the bale processor input shaft (22) and ending at the bale cutter (14) itself.

In operation of that part of FIGS. 2 and 3 that controls the speed of the conveyor (16), a speed signal that is a function of the speed of the rotor (14) is sensed by proximity sensor (20), with that speed signal going to the central processor unit or "processor" (24). Based on that input, the processor (24) then adjusts the proportional flow rate hydraulic control valve (25) to cause the hydraulic motor (27) to rotate faster or slower depending upon the load sensed on the cutter/rotor (14). Since a tractor's power take off (31) speed is a function of the speed of the tractor's engine (not shown), if the power take off (31) speed is below a predetermined speed, then that is an indication that the engine is turning too slowly to be efficient. In that case the system will reduce the speed of the conveyor (16), reducing the load on the rotor (14) and thereby allowing the speed of the conveyor (16) and, accordingly, the engine of the tractor to increase to a more efficient speed (rpm). On the other hand, if a reduced load on the cutter/rotor (14) is sensed, via the proximity switch (20), then that is an indication that the conveyor (16) speed can be increased to feed the bale more quickly to the cutter/rotor (14) without reducing the speed of the tractor's engine outside of its optimum operating rpm range.

The valve (26), on the other hand, is a two direction (double acting) volume control hydraulic valve (26) that sends pressurized fluid to one side or the other of piston (28) to control the pivoting of the slug bars (18*s*). If the piston (28) inside the cylinder shown in FIG. 2 moves to the right, then the slug bars (18*s*) pivot up around pivot point (18*a*), and, as such, less of the flails (14*f*) extend upwardly beyond the slug bars (18*s*). This means that smaller bites of hay will be taken from the bale during each rotation of the cutter (14). When the piston (28) moves to the left, the slug bars (18*s*) pivot downwardly about pivot point (18*a*), causing the flails to extend upwardly more than shown in FIG. 2, thereby taking a bigger "bite" out of the bale during each rotation of the bale cutter rotor (14).

In operation of that part of FIGS. 2 and 3 that controls the pivoting of the slug bars (18*s*), a signal that is a function of the speed of the rotor (14) is sensed by proximity sensor (20). That signal going from sensor (20) to the processor (24) then adjusts the two direction (double acting) volume control hydraulic valve (26) to cause the slug bars (18*s*) to be pivoted up when the load sensed is too high and to cause the slug bars (18s) to pivot downwardly when the load sensed on the cutter/rotor (14) is lower than a predetermined optimum load range. Other optional ways, none of which are shown herein, to move the slug bars (18s) up and down would be (1) a double acting hydraulic valve connected to a cylinder, (2) an electric actuator by itself or connected to a linkage, (3) a double acting air valve connected to a pneumatic cylinder, (4) a gear or pulley connected to a linkage or cam to move the slug bars up and down or (5) motor connected to a linkage or cam to move the slug bars up and down.

Automatic adjustment of the height and/or angle of the bale support bars (18s) is based on the operating speed of the tractor's PTO, or a function thereof, which is essentially the sensed operating load on the tractor. This allows a bale to be processed smoothly and evenly.

Minimum and maximum input frequencies are specified in the controller software, and the output voltage to the coils either raises or lowers the bale support bars (18s) based on the frequency input and feedback from a position sensor on the bale support bars. If the input frequency from the proximity switch (20) is at or below the minimum frequency specified in the controller software, the bale support bars are raised until they are either completely extended or until the input frequency increases enough to cause them to lower again—whichever comes first.

If the input frequency from the proximity switch (20) is at or above the maximum frequency specified in the controller software, the bale support bars are lowered until they either are completely retracted or the input frequency is reduced and causes them to raise again—whichever comes first. If the generated frequency is somewhere between the minimum and the maximum frequencies which are specified in the software, the bale support bars (18s) are raised or lowered to the point where they correspond to the associated height, linearly between fully retracted and fully extended points.

Feedback from the position sensor (20a) (FIG. 2) allows the system to "know" where the bale support bars (18s) are located at any time, and adjust them up or down between the extended and retracted positions as needed, based on input frequency (in effect, the sensed load). Position sensor (20a), shown in FIG. 2, is attached to the linkage between the cylinder (28) and the bale support bars (18s). It is to be understood that the placement of this position sensor (20a) is not critical, but only that there is a position sensor (20a) somewhere in the system to tell the CPU where the bale support bars (18s) are at any given time. A lower frequency means that the tractor engine is being pulled down (i.e., experiencing high workloads). A higher frequency means that the tractor is running at full throttle. Equations have been derived to determine how many gear teeth on gear (21/21a) generate a given frequency per revolution. These equations are based on factors such as the number of gear teeth on gear (21) per revolution, the size of the gear, the speed of rotation of the gear, etc. These equations are used to determine the minimum and maximum frequencies to program into the controller.

Figure 4:
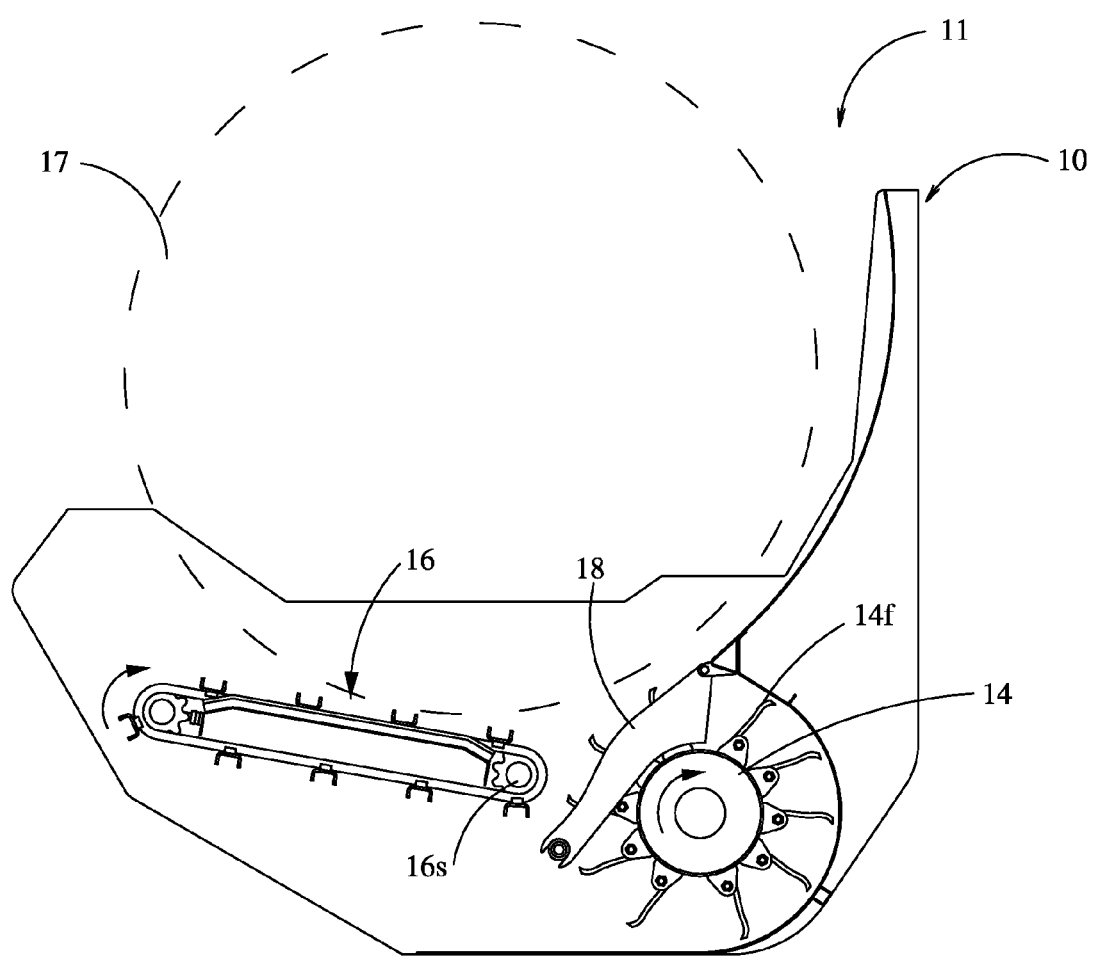
FIG. 4 is a schematic cross sectional like view of the bale processor of FIG. 1 having a chain conveyor for conveying a bale to a bale cutter.
Figure 5:
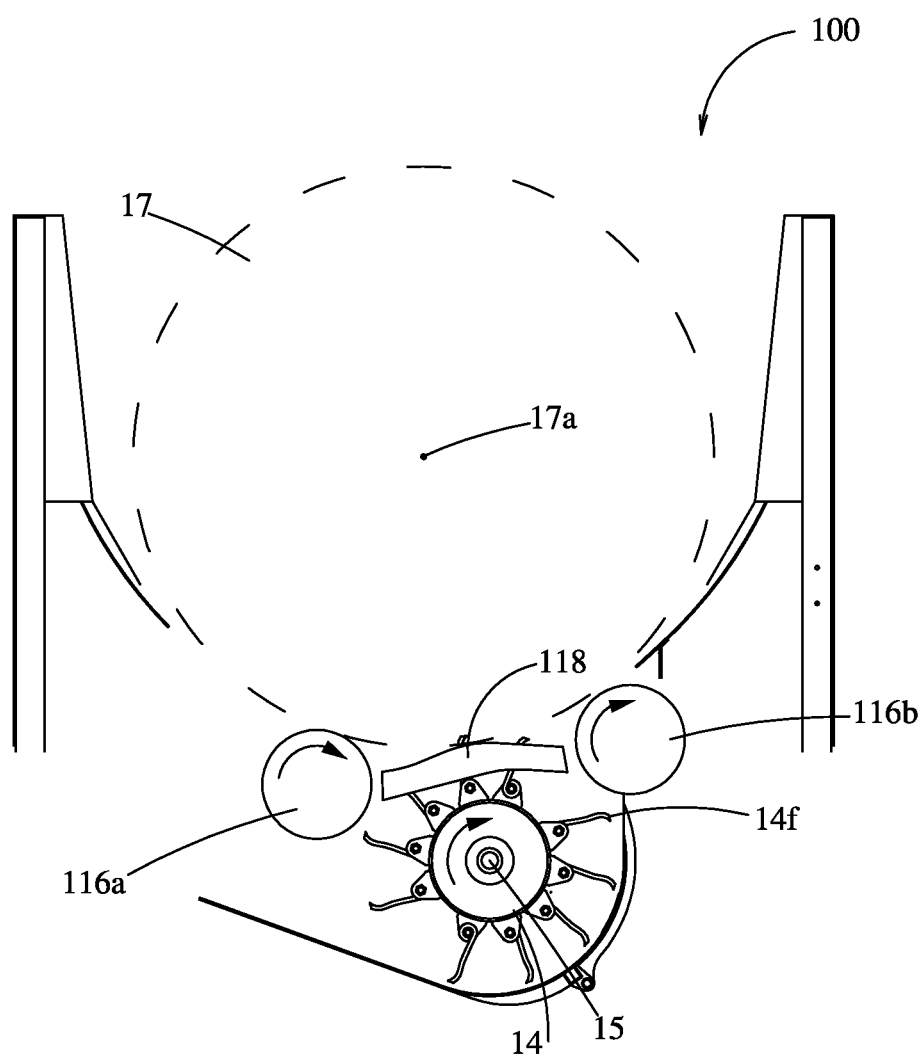
FIG. 5 is a schematic cross sectional like view of a bale processor similar to that of FIG. 4, but showing a bale processor using rollers instead of a chain conveyor to convey a bale to a bale cutter.

The embodiment in FIG. 5 is like the FIG. 1-4 embodiment except that, instead of using a chain conveyor (16), roller conveyors (116a) and (116b) are used. The rotation thereof can be controlled exactly as described above with respect to controlling the rotation of sprocket (16s) of conveyor (16). It is to be understood that any number of roller conveyors (116a/116b) could be used, alone or in conjunction with at least one chain conveyor (16), to support the bale (17) in conjunction with slug bars (118). The slug bars (118) could pivot and be controlled like slug bars (18s) of the engagement limiting device (18) as shown in FIGS. 1-4. Other types of conveyors besides the two examples shown in FIGS. 4 and 5 are clearly useable, as well, without departing from the present invention.

Figure 6:
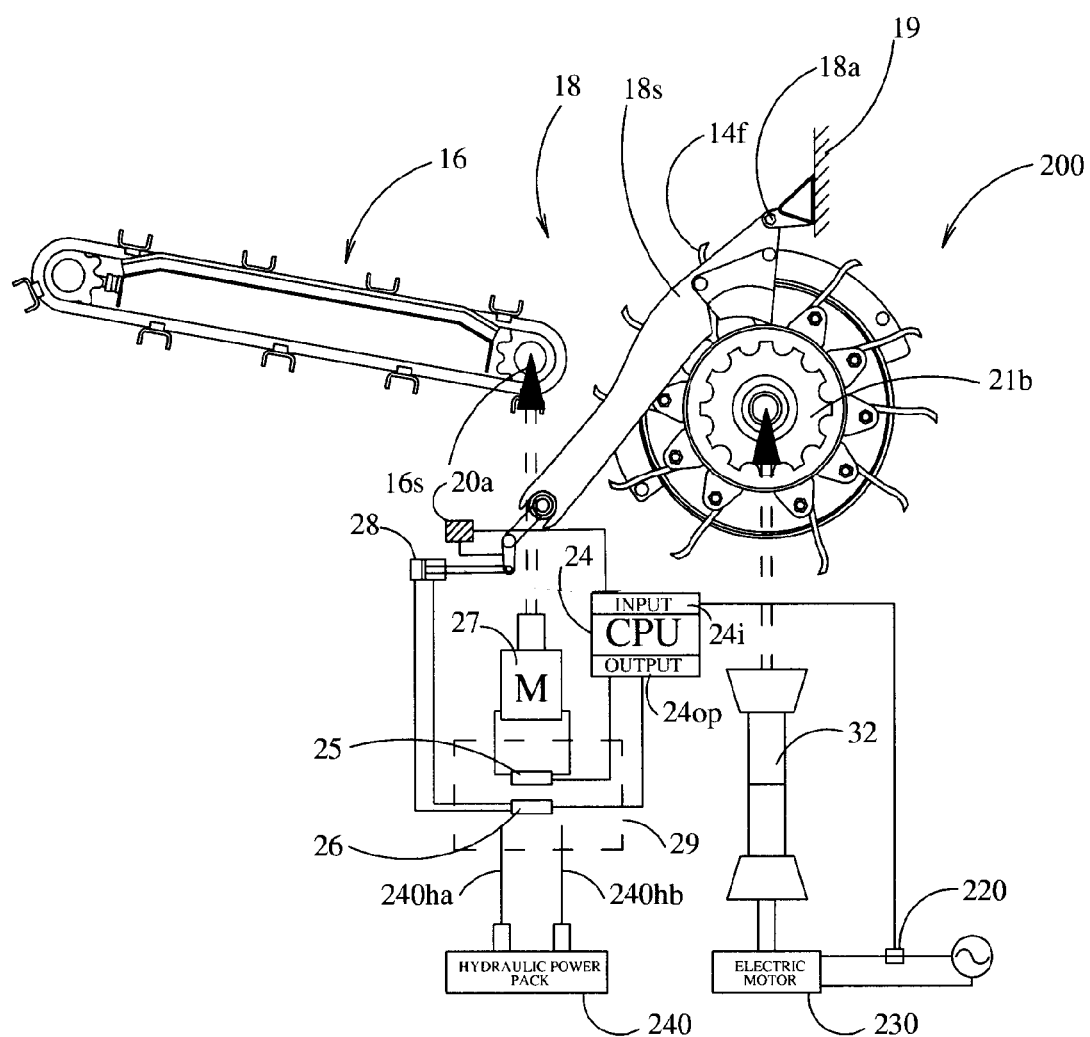
FIG. 6 is a schematic cross sectional like view similar to FIG. 2, but showing an alternate control system that is powered by an electric motor instead of by a tractor as in the embodiment of FIG. 2.

Turning now to an embodiment (200) shown in the schematic of FIG. 6, an alternate power supply and source of hydraulic fluid are provided relative to those shown in FIG. 2. In particular, instead of using the power take off (31) of tractor (30), an electric motor (230) is used to rotate the cutter/rotor (14). Additionally, a hydraulic power pack (240) supplies hydraulic fluid via lines (240ha/240hb) to the hydraulic system shown schematically in the dashed line box 29 instead of using the hydraulic system of the tractor (30).

A primary difference between the FIG. 6 embodiment (200) and the FIG. 2 embodiment is that, instead of sensing the rotational speed on gear (21b), the load on the electric motor (230) is sensed by an ammeter (220). The load monitor is an ammeter, the output of the ammeter being used for determining the load on an electric motor being used to power the bale cutter. The ammeter (220) then provides an input signal (224i) to the central processing unit/CPU (224). The CPU, in turn, sends output signals (224op) to automatically operate the proportional flow rate hydraulic control valve (25) and/or the two direction (double acting) volume control hydraulic valve (26). In particular relation to the operation of the two direction (double acting) volume control hydraulic valve (26), the controller/processor/CPU (224) sends an output voltage (i.e., output signal (224op)) out to coils on a two direction (double acting) volume control hydraulic valve (26).

In operation of that part of FIG. 6 that controls the speed of the conveyor (16), a signal that is a function of the amount of current (e.g., measured in amps) flowing to the electric motor (230) is sensed by the ammeter (220). That current signal goes to the processor (224), which then adjusts the proportional flow rate hydraulic control valve (25) to cause the hydraulic motor (27) to rotate faster or slower, depending upon the load sensed on the electric motor (230). The electric motor (230) selected to drive the processor (200) has a rated power, and the speed that the material is processed through rotor (14) will be controlled so that this power draw does not exceed the rated power of the motor (230). If the load on motor (230) is above a predetermined amount, that would be an indication that the power draw on the motor (230) is approaching the rated power that should not be exceeded. (It is noted that load and power draw are used interchangeably herein as equivalents.) In that case the system would reduce the speed of the conveyor (16), reducing the load on the rotor (14) and accordingly reduce the load on the electric motor (230). On the other hand, if a reduced load on the electric motor (230) were to be sensed, via the ammeter (220), then that would be an indication that the electric motor (230) can work harder and still be in an optimum operating range. Accordingly the speed of the conveyor (16) would be automatically increased, feeding the bale faster via the conveyor (16) to the rotor (14), thereby increasing the load on the rotor (14). This will allow the load on the electric motor (230) to increase to a more efficient power draw within the optimum operating power draw range of the electric motor (230).

The valve (26), on the other hand, is a two direction (double acting) volume control hydraulic valve (26) that sends pressurized fluid to one side or the other of piston (28) to control the pivoting of the slug bars (18s). If the piston

(28) inside the cylinder (shown in FIG. 2) moves to the right, then the slug bars (18s) pivot up around pivot point (18a), effectively reducing the portion of the flails (14f) that extends upwardly beyond the slug bars (18s). This means that smaller bites of hay or other bale material would be taken from the bale during each rotation of the cutter (14). When the piston (28) moves to the left, the slug bars (18s) pivot downwardly about pivot point (18a), increasing the portion of the flails that extends upwardly beyond the slug bars (18s), thereby taking a bigger "bite" out of the bale during each rotation of the bale cutter rotor (14).

In operation of that part of FIG. 6 that controls the pivoting of the slug bars (18s), a signal that is a function of the load on the electric motor is sensed by ammeter (220). That current-based signal goes to the processor (224). Based on that signal level, the processor (224) adjusts the two direction (double acting) volume control hydraulic valve (26) to cause the slug bars (18s) to be pivoted up when the load sensed on the electric motor (230) is too high and to cause the slug bars (18s) to pivot downwardly when the load sensed on the electric motor (230) is too low. It is noted that a like proximity switch (20) and position sensor (20a) in FIG. 2 could and, in fact, would likely also be employed in the FIG. 6 system, although not specifically shown therein. The proximity switch and the position sensor would be expected to work just like it is described above with respect to FIG. 2. For example, the position sensor (20a) would allow the system to "know" where the bale support bars (18s) are located at any time and would then adjust the support bars (18s) up or down between the extended and retracted positions as needed, based on input frequency (in effect, the sensed load). It is also to be understood, however, that any sensor and/or switching combination that could serve generally the same function and achieve generally the same result as the proximity switch (20) and position sensor (20a) would be considered to be within the scope of the present feed control system.

The FIG. 6 embodiment (200), similar to the first embodiment (10), can automatically adjust the height and/or angle of the bale support bars (18s) and/or the bale conveyance rate. In the case the second embodiment, it does so based on the load on the electric motor. This allows a bale to be processed smoothly and evenly.

The present invention, in its broadest sense, relates to using (1) an input signal (24i/224i) corresponding to a dynamic sensing and/or measurement of a drive system component associated with the power draw on the drive system of a bale processor; (2) feeding that input signal (24i/224i) to a central processing unit (CPU) (24/224); (3) using the CPU (24/224) to produce an output signal (24op/224op) proportional to the input signal (24i/224i); (4) feeding the output signal (24op/224op) to a load control device such as (but not limited to) proportional flow rate hydraulic control valve (25) or two direction (double acting) volume control hydraulic valve (26) that respectively adjusts the feeding (16/116) and/or shredding (14/114) of the bale to optimize the use/power draw of a tractor's engine, a motor (230), or other power source. The drive system components of the bale processor (10) includes one of a motor (230) and an engine of a tractor (30), at least one drive linkage (32) to transfer power from the one of a motor (230) or an engine (30) to the bale cutter (14), and the bale/cutter (14) receives the power transfer. The power draw can be measured directly or measured indirectly by sensing at least one of the speed, torque and/or load on at least one of the drive system components. The feed control system includes a speed sensor (20) for sensing the speed of rotation of a drive system component (for example in FIGS. 2 and 3) at a position in a drive train between a tractor power take off and a rotating part (for example 21a or 21b) on the bale cutter (14), inclusive.

In FIG. 2, the input sensor (20) is sensing the rotational speed of the rotor (14). But it is to be understood however that the sensor (20) could sense any parameter that has a direct relationship to the power draw or drive system of the engine of the tractor, such as, but not limited to, the rotational speed of the tractor power take off (PTO) or an input shaft such as input shaft (22) shown in FIG. 3, or data from the tractor's control system (ISOBUS). Similarly, in the FIG. 6 embodiment, the load measured by the ammeter (220) measures directly the load on the electric motor (230). The definition of "the load of the electric motor . . . " is "the load (i.e., the power draw) on the electric motor (230)." But the power draw could be measured directly or indirectly by sensing the speed, torque, load, etc., on the rotor, shaft, or other dynamic element of the drive system, the "drive system" being defined as the motor/engine and any of the various drive linkages used to transfer power from the engine/motor to the bale processor (10).

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. A bale processor, comprising a bale processing bin; a drive system including a drive system component mounted relative to and extending within the bale processing bin;
a bale cutter rotatably mounted proximate the bale processing bin, the bale cutter being configured to be driven by the drive system, the bale cutter being configured for at least one of cutting and grinding a bale of filamentary material in the bale processing bin;
an engagement limiting device mounted proximate to the bale cutter for supporting a first portion of the weight of the bale, a portion of the bale cutter extending upwardly beyond the engagement limiting device, the engagement limiting device being configured for limiting engagement of the bale with the bale cutter;
a bale conveyor mounted within the bale processing bin, the bale conveyor being offset from the bale cutter and the engagement limiting device, the bale conveyor being configured for supporting a second portion of the weight of the bale; and
a feed control system that monitors a dynamic condition of the drive system component, the dynamic condition being associated with a power draw made on the drive system by the bale cutter during at least one of cutting and grinding a bale of filamentary material, the feed control system being configured to automatically control a position of the engagement limiting device based on the dynamic condition of the drive system component.

2. The bale processor of claim 1, wherein the bale cutter comprises a rotatable shaft and at least one cutter element extending substantially radially therefrom.

3. The bale processor of claim 2, wherein the rotatable shaft is configured for linkage to a driven shaft, the feed control system being configured for sensing at least one of a dynamic speed, load, and torque on a given drive system component, the feed control system further being configured for adjusting at least one of a conveyance speed of the conveyance drive mechanism and a position of the engagement limiting device based upon the sensed at least one of a dynamic speed, load, and torque.

4. The bale processor of claim 3, wherein the bale conveyor defines a conveyance surface configured for contacting and supporting the bale, the conveyance surface having an associated conveyance surface angle relative to horizontal, the conveyance surface angle being an acute angle.

5. The bale processor of claim 4, wherein the conveyance surface angle is in the range of 5° to 30°.

6. The bale processor of claim 5, wherein the conveyance surface angle is in the range of 8° to 20°.

7. The bale processor of claim 2, wherein a given cutter element establishes a cutter radius about the rotatable shaft and a corresponding radial cutter height, the bale conveyor defining a bale contact surface, at least portion of the bale contact surface protruding above the radial cutter height.

8. The bale processor of claim 1, wherein the engagement limiting device is mounted to one of the bale cutter and the bale processing bin.

9. The bale processor of claim 8, wherein the engagement limiting device is comprised of at least one bale support element.

10. The bale processor of claim 1 wherein drive system components of the bale processor includes one of a motor and an engine, at least one drive linkage to transfer power from the one of a motor and an engine to the bale cutter, and the bale cutter receiving the power transfer, and wherein the power draw can be measured directly or measured indirectly by sensing at least one of the speed, torque, and load on at least one of the drive system components.

11. The bale processor of claim 1 wherein the feed control system includes a speed sensor for sensing the speed of rotation of a drive system component at a position in a drive train between and including a tractor power take off and a rotating part on the bale cutter.

12. The bale processor of claim 1 wherein the load monitor is an ammeter, the output of the ammeter being used for determining the load on an electric motor being used to power the bale cutter.

13. The bale processor of claim 1 wherein the engagement limiting device comprises at least one bale support bar pivotally mounted relative to the frame.

14. The bale processor of claim 1 wherein that the engagement limiting device is positioned between a first portion of the conveyor and the bale cutter.

15. The bale processor of claim 1 wherein the bale cutter is configured for directly engaging a portion of a given bale.

16. The bale processor of claim 1 wherein at least a portion of the conveyor is located at or above the rotary axis of the bale cutter.

17. The bale processor of claim 1 wherein the bale cutter has an axis of rotation and at least one radially outermost cutting edge when the bale cutter is rotating, and further wherein at least a part of the engagement limiting device is disposed between the axis of rotation of the cutter and the at least one radially outermost cutting edge.

18. A method of operating a bale processor comprising a bale processing bin; a drive system mounted relative to and extending into the bale processing bin, the drive system including a drive system component capable of being monitored, a bale cutter rotatably mounted within the bale processing bin, the bale cutter being configured to be driven by the drive system, the bale cutter being configured for at least one of cutting and grinding a bale of filamentary material; an engagement limiting device mounted proximate to the bale cutter for supporting a first portion of the weight of the bale, a portion of the bale cutter extending upwardly beyond the engagement limiting device, the engagement limiting device being configured for limiting engagement of the bale with the bale cutter; and a bale conveyor mounted within the bale processing bin, the bale conveyor being offset from the bale cutter and the engagement limiting device, the bale conveyor being configured for supporting a second portion of the weight of the bale, the method comprising:

inserting the bale within the bale processing bin and bringing the bale into initial contact with at least the bale conveyor;

moving the bale using the bale conveyor into operative contact with the bale cutter and the engagement limiting device such that the bale is supported by both the bale conveyor and the engagement limiting device, the bale being moved at a bale conveyance speed by the bale conveyor;

shredding the bale using the bale cutter and at least at times continuously moving the bale toward bale cutter using the bale conveyor;

monitoring a dynamic condition of a drive system component associated with a power draw on the drive system by the bale cutter during at least one of the cutting and grinding of a bale of filamentary material; and automatically controlling the position of the engagement limiting device based on the dynamic condition of the drive system component.

19. A bale processor, comprising:

a bale processing bin;

a drive system having a drive system component, the drive system being mounted proximate the bale processing bin;

a bale cutter mounted in the bale processing bin, the bale cutter being configured for cutting and grinding a bale of filamentary material;

an engagement limiting device mounted proximate to the bale cutter, the engagement limiting device being configured for supporting a first portion of the weight of the bale;

a bale conveyor configured for supporting a second portion of the weight of the bale and configured for causing the bale to move; and a feed control system configured to monitor a dynamic condition of the drive system component associated with a power draw on the drive system and configured to automatically control the position of the engagement limiting device based on the dynamic condition of the drive system component.

20. A bale processor, comprising:

a bale processing bin;

a drive system mounted relative to the bale processing bin, the drive system including a drive system component capable of being monitored;

a bale cutter rotatably mounted within the bale processing bin, the bale cutter being configured to be driven by the drive system, the bale cutter being configured for at least one of cutting and grinding a bale of filamentary material;

an engagement limiting device mounted proximate to the bale cutter for supporting an additional portion of the weight of the bale while limiting engagement of the bale with the bale cutter;

a bale conveyor mounted within the bale processing bin, the bale conveyor being offset from the bale cutter, the bale conveyor being configured for supporting only a portion of the weight of the bale; and a feed control system configured to monitor a dynamic condition of a drive system component, the dynamic condition being associated with a power draw made on the drive system by the bale cutter during at least one of cutting and grinding a bale of filamentary material, the feed control system being configured to automatically control a position of the engagement limiting device based on the dynamic condition of the drive system component.

21. The bale processor of claim 20, wherein the feed control system is further configured to automatically control the speed of the bale conveyor based on the dynamic condition of the drive system component.

* * * * *